(12) United States Patent
Tomida et al.

(10) Patent No.: US 11,207,925 B2
(45) Date of Patent: Dec. 28, 2021

(54) TIRE

(71) Applicant: BRIDGESTONE CORPORATION, Tokyo (JP)

(72) Inventors: Tatsuya Tomida, Kodaira (JP); Hideyuki Sakurai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 805 days.

(21) Appl. No.: 15/562,882

(22) PCT Filed: Mar. 30, 2016

(86) PCT No.: PCT/JP2016/001850
§ 371 (c)(1),
(2) Date: Sep. 28, 2017

(87) PCT Pub. No.: WO2016/157903
PCT Pub. Date: Oct. 6, 2016

(65) Prior Publication Data
US 2018/0111424 A1 Apr. 26, 2018

(30) Foreign Application Priority Data

Apr. 1, 2015 (JP) .............................. JP2015-075324

(51) Int. Cl.
*B60C 11/03* (2006.01)
*B60C 11/13* (2006.01)
(Continued)

(52) U.S. Cl.
CPC ............ *B60C 11/1323* (2013.01); *B60C 1/00* (2013.01); *B60C 1/0016* (2013.01); *B60C 5/00* (2013.01);
(Continued)

(58) Field of Classification Search
CPC ......... B60C 11/1323; B60C 2011/0353; B60C 2011/0344; B60C 2011/0355; B60C 11/042
(Continued)

(56) References Cited

U.S. PATENT DOCUMENTS 4,649,975 A * 3/1987 Kogure .................... B60C 11/12
152/209.22
4,748,199 A 5/1988 Takiguchi et al.
(Continued)

FOREIGN PATENT DOCUMENTS

CN 101168341 A 4/2008
CN 101663352 A 3/2010
(Continued)

OTHER PUBLICATIONS

Machine Translation: JP-2009214759-A; Furusawa, Hiroshi; (Year: 2020).*

(Continued)

*Primary Examiner* — Kendra Ly
(74) *Attorney, Agent, or Firm* — Kenja IP Law PC (57) ABSTRACT

This disclosure aims to provide a tire having excellent braking performance on dry road surface and on wet road surface, and having excellent steering stability. This disclosure is a tire comprising a tread 10, wherein: the tread 10 has a plurality of circumferential grooves extending continuously in a tire circumferential direction C, the circumferential grooves including circumferential main grooves 21*a*, 21*b*, 22 with a cross-sectional area in a tire width direction W of 10 mm² or more, and a groove width Lb at a 95% groove depth position with a groove depth of a groove bottom as 100% of at least the circumferential groove 21*a* located on an outermost side when mounted to a vehicle among the circumferential main grooves 21*a*, 21*b*, 22 being
(Continued)

25% to 60% with respect to a groove width Lt on a tread surface.

15 Claims, 4 Drawing Sheets

(51) Int. Cl.
  *B60C 1/00* (2006.01)
  *C08L 9/00* (2006.01)
  *C08L 9/06* (2006.01)
  *B60C 5/00* (2006.01)
  *B60C 11/00* (2006.01)
  *B60C 11/12* (2006.01)
  *C08K 3/04* (2006.01)
  *C08K 3/36* (2006.01)
  *C08K 5/01* (2006.01)
  *C08K 11/00* (2006.01)
  *C08L 7/00* (2006.01)

(52) U.S. Cl.
  CPC .......... *B60C 11/0008* (2013.01); *B60C 11/03* (2013.01); *B60C 11/0304* (2013.01); *B60C 11/12* (2013.01); *B60C 11/13* (2013.01); *C08K 3/04* (2013.01); *C08K 3/36* (2013.01); *C08K 5/01* (2013.01); *C08K 11/00* (2013.01); *C08L 7/00* (2013.01); *C08L 9/00* (2013.01); *C08L 9/06* (2013.01); *B60C 2011/0025* (2013.01); *B60C 2011/0341* (2013.01); *B60C 2011/0353* (2013.01); *C08K 2201/006* (2013.01)

(58) Field of Classification Search
  USPC .................................................. 152/209.24
  See application file for complete search history.

(56) References Cited

U.S. PATENT DOCUMENTS

| | | | | |
|---|---|---|---|---|
| 5,337,815 A | * | 8/1994 | Graas | B60C 11/0302 |
| | | | | 152/209.14 |
| 5,810,953 A | * | 9/1998 | Tanaka | B60C 1/0016 |
| | | | | 152/209.2 |
| 5,814,169 A | * | 9/1998 | Yamaguchi | B60C 11/11 |
| | | | | 152/209.22 |
| 5,957,179 A | * | 9/1999 | Graas | B60C 11/0302 |
| | | | | 152/209.14 |
| 6,121,367 A | * | 9/2000 | Corvasce | C08J 3/226 |
| | | | | 524/492 |
| 2001/0000516 A1 | | 4/2001 | Blok et al. | |
| 2002/0177641 A1 | * | 11/2002 | Ezawa | C08L 21/00 |
| | | | | 524/191 |
| 2008/0092999 A1 | | 4/2008 | Miyazaki | |
| 2009/0054582 A1 | * | 2/2009 | Hogan | C08L 15/00 |
| | | | | 524/495 |
| 2010/0139826 A1 | * | 6/2010 | Matsumoto | B60C 11/1369 |
| | | | | 152/209.18 |
| 2010/0181002 A1 | | 7/2010 | Miyazaki | |
| 2010/0186861 A1 | * | 7/2010 | Ishiguro | B60C 11/033 |
| | | | | 152/209.25 |
| 2011/0190440 A1 | | 8/2011 | Ohta et al. | |
| 2012/0318420 A1 | * | 12/2012 | Sawai | B60C 11/042 |
| | | | | 152/209.15 |
| 2014/0090764 A1 | * | 4/2014 | Miyazaki | C08K 3/04 |
| | | | | 152/450 |
| 2014/0243448 A1 | * | 8/2014 | Lesage | C08L 7/00 |
| | | | | 523/157 |
| 2015/0031792 A1 | * | 1/2015 | Dunlavy | C08L 91/00 |
| | | | | 523/157 |
| 2016/0185158 A1 | * | 6/2016 | Aoki | B60C 11/0327 |
| | | | | 152/209.25 |

FOREIGN PATENT DOCUMENTS

| | | | | |
|---|---|---|---|---|
| CN | 101821115 A | | 9/2010 | |
| EP | 2028025 A1 | | 2/2009 | |
| EP | 2465705 A1 | | 6/2012 | |
| FR | 819836 A | * | 10/1937 | ............ B60C 11/00 |
| JP | 09323511 A | * | 12/1977 | |
| JP | H0967469 A | | 3/1997 | |
| JP | 09323511 A | * | 12/1997 | |
| JP | 10029409 A | * | 2/1998 | ......... B60C 11/1323 |
| JP | 2002179842 A | | 6/2002 | |
| JP | 2002240512 A | * | 8/2002 | ......... B60C 11/1323 |
| JP | 2003146024 A | * | 5/2003 | |
| JP | 2007284553 A | | 11/2007 | |
| JP | 2009202639 A | | 9/2009 | |
| JP | 2009214759 A | * | 9/2009 | ......... B60C 11/1323 |
| JP | 2010254166 A | | 11/2010 | |
| JP | 2011079876 A | | 4/2011 | |
| JP | 2011111497 A | | 6/2011 | |
| JP | 2011183993 A | | 9/2011 | |
| JP | 2012511616 A | | 5/2012 | |
| JP | 2012158697 A | | 8/2012 | |
| JP | 2012254654 A | * | 12/2012 | |
| JP | 2012254654 A | | 12/2012 | |
| JP | 2014218099 A | | 11/2014 | |
| JP | 2015016751 A | * | 1/2015 | ......... B60C 11/0306 |
| WO | 2011027889 A1 | | 3/2011 | |

OTHER PUBLICATIONS

Machine Translation: JP-2015016751-A; Aoki Naotomo; (Year: 2020).*
Machine Translation: JP-2012254654-A; Takahashi, Junichi; (Year: 2020).*
Machine Translation: FR-819836-A; Camille Desrue Paul; (Year: 2020).*
Machine Translation: JP-09323511-A; Tagashira, Kenji; (Year: 2020).*
Machine Translation: JP-2003146024-A, Matsumoto, Tadao, (Year: 2021).*
Machine Translation: JP-2002240512-A, Fujita, Kazuto, (Year: 2021).*
Machine Translation: JP-10029409-A, Ishii, Fumito, (Year: 2021).*
Machine Translation: JP-2012254654-A, Takahashi, Junichi, (Year: 2021).*
Machine Translation: JP-09323511-A, Tagashira, Kenji, (Year: 2021).*
Nov. 16, 2018, search result of the Office Action issued by the State Intellectual Property Office in the corresponding Chinese Patent Application No. 201680020524.4.
Mar. 26, 2018, Search Result of Extended European Search Report issued by the European Patent Office in the corresponding European Patent Application No. 16771789.1.

* cited by examiner

TIRE

TECHNICAL FIELD

This disclosure relates to a tire.

BACKGROUND

In view of improving vehicle safety, it is desired to improve tire's braking performance and driving performance not only on a dry road surface but on various road surfaces such as a wet road surface and an icy and snowy road surface.

For example, PTL1 (JPH09-67469A) discloses a tire using a tread rubber with increased 0° C. tan δ for the purpose of improving the gripping performance on wet road surface.

On the other hand, in the case where a tire is used throughout a year, since the road surface temperature varies depending on change of the seasons, etc., there are cases that the fuel efficiency varies when the tire runs in ordinary temperature environment and when the tire runs in low temperature environment. It has been discovered that such variation of fuel efficiency increases as the 0° C. tan δ increases. Then, we discovered that by using a rubber composition having specific physical properties (specifically, a tan(at 0° C. being 0.25 to 0.55, a difference between a tan δ at 30° C. and a tan δ at 60° C. being −0.02 to 0.07, and a dynamic storage modulus at a dynamic strain of 1% and 0° C. being 4 MPa to 20 MPa) to a tread, it is possible to reduce the difference between the fuel efficiency in low temperature environment and the fuel efficiency in ordinary temperature environment, and to sufficiently ensure the wet performance.

CITATION LIST

Patent Literature

PTL 1: JPH09-67469A

SUMMARY

Technical Problem

However, in a tire using a tread rubber having the aforementioned physical properties, further improvement of the braking performance on dry road surface is desired, and better wet braking performance is requested on a road surface which is more slippery as compared to asphalt, such as manhole and the like.

Therefore, it was desired to improve the braking performance on dry road surface and on wet road surface by further studying the formulation of the rubber composition. However, even in the case where it was possible to improve the braking performance on dry road surface and on wet road surface by studying the formulation of the rubber composition, deterioration of the steering stability was predicted. Since optimization of the formulation of the rubber composition is for the purpose of improving the braking performance by adjusting the loss property at low temperature and at high temperature, the rigidity of the tread was not considered, and there was a risk of deterioration of the steering stability due to deterioration of the tread rigidity.

Then, this disclosure aims to provide a tire having excellent braking performance on dry road surface and on wet road surface, and having excellent steering stability.

Solution to Problem

In order to achieve the aforementioned purpose, we have intensively studied a tire including a tread formed by using a rubber composition having specific physical properties.

Further, we discovered that regarding the tread, by setting within a specific range a tire widthwise cross-sectional area of circumferential main grooves extending continuously in a tire circumferential direction, and further, by setting to a small value a groove width Lb at a 95% groove depth position with a groove depth of a groove bottom as 100% of at least a circumferential groove located on an outermost side when mounted to a vehicle among the circumferential main grooves, it is possible to improve the land portion rigidity of the tread as compared to the case of forming conventional circumferential grooves, and thus it is possible to maintain excellent performance for braking on dry road surface and on wet road surface, and to simultaneously achieve excellent steering stability. Thereby, we have accomplished this disclosure.

The tire of this disclosure is a tire comprising a tread formed by using a rubber composition of which a tan δ at 0° C. is 0.25 to 0.55, a difference between a tan δ at 30° C. and a tan δ at 60° C. is −0.02 to 0.07, and a dynamic storage modulus at a dynamic strain of 1% and 0° C. is 4 MPa to 20 MPa, wherein: the tread has a plurality of circumferential grooves extending continuously in a tire circumferential direction, the circumferential grooves including circumferential main grooves with a groove widthwise cross-sectional area of 10 mm² or more, and a groove width Lb at a 95% groove depth position with a groove depth of a groove bottom as 100% being 25% to 60% with respect to a groove width Lt on a tread surface in at least a circumferential main groove located on an outermost side when mounted to a vehicle among the circumferential main grooves.

According to the aforementioned configuration, it is possible to achieve both excellent braking performance on dry road surface and on wet road surface and excellent steering stability.

Moreover, in the tire of this disclosure, it is more preferable that when at least the circumferential groove located on an outermost side when mounted to a vehicle among the circumferential main grooves is divided into a tire widthwise outer part and a tire widthwise inner part as viewed in a groove widthwise cross section, with a groove widthwise central line on the tread surface as a reference, a tire widthwise cross-sectional area of the tire widthwise outer part is no less than a tire widthwise cross-sectional area of the tire widthwise inner part.

This is because that it is possible to ensure excellent drainage performance, and to simultaneously achieve more excellent steering stability.

In the tire of this disclosure, it is preferable that a groove width L3 at a 30% groove depth position is 85% to 110% with respect to the groove width Lt on the tread surface in at least a circumferential main groove located on an outermost side when mounted to a vehicle among the circumferential main grooves.

This is because that it is possible to ensure excellent steering stability, and to simultaneously achieve more excellent drainage performance.

In the tire of this disclosure, it is preferable that the tread is formed with a rubber composition containing: a rubber component A containing 50 mass % or more of a diene based rubber; and 5 to 50 parts by mass per 100 parts by mass of the rubber component of at least one additive component B selected from a thermoplastic resin, an oil or a low molecular weight aromatic vinyl compound-conjugated diene compound copolymer with a polystyrene-equivalent weight-average molecular weight of 5,000 to 200,000 measured by gel permeation chromatography.

This is because that it is possible to improve the braking performance on dry road surface and on wet road surface more securely.

Moreover, in the tire of this disclosure, it is preferable that the diene based rubber is a natural rubber or a butadiene rubber.

This is because that it is possible to improve the braking performance on dry road surface and on wet road surface more securely.

In the tire of this disclosure, it is preferable that the thermoplastic resin is a C5 based resin, a C9 based resin, a C5 to C9 based resin, a dicyclopentadiene based resin, a rosin based resin, an alkylphenol based resin, or a terpene-phenol based resin.

This is because that it is possible to improve the braking performance on dry road surface and on wet road surface more securely.

In the tire of this disclosure, it is more preferable that the additive component B contains a Novolak-type phenol resin. This is because that it is possible to achieve more excellent steering stability.

In the tire of this disclosure, it is preferable that the rubber composition further contains a carbon black with a nitrogen adsorption specific surface area of 110 $m^2/g$ or more and a carbon black with a nitrogen adsorption specific surface area of 80 $m^2/g$ or less.

This is because that it is possible to achieve more excellent steering stability.

In the tire of this disclosure, it is preferable that the rubber composition contains 50 mass % or more of a styrene-butadiene rubber of which the percentage of a bound styrene content among all polymer units+the percentage of a vinyl bond content among all polymer units×½ equals 25% or less.

This is because that it is possible to improve the braking performance on dry road surface and on wet road surface more securely.

Advantageous Effect

According to this disclosure, it is possible to provide a tire having excellent braking performance on dry road surface and on wet road surface, and having excellent steering stability.

DETAILED DESCRIPTION

An embodiment of the tire of this disclosure will be described below with reference to the drawings.

The tire of this disclosure is a tire including a tread formed by using a rubber composition containing a rubber component and a thermoplastic resin.

Further, although not illustrated, the tire of this disclosure, as usual ones, may have a configuration having: a pair of bead portions; a carcass which is formed by a pair of sidewall portions continuous to tire radial outer sides of the bead portions and a tread portion extending between the sidewall portions, and extends toroidally across these portions between bead cores embedded in the bead portions; a belt formed by a plurality of belt layers arranged on a tire radial outer side of a crown portion of the carcass; and a tread disposed on a tire radial outer side of the belt.

<Structure of Tread>

Figure 1:
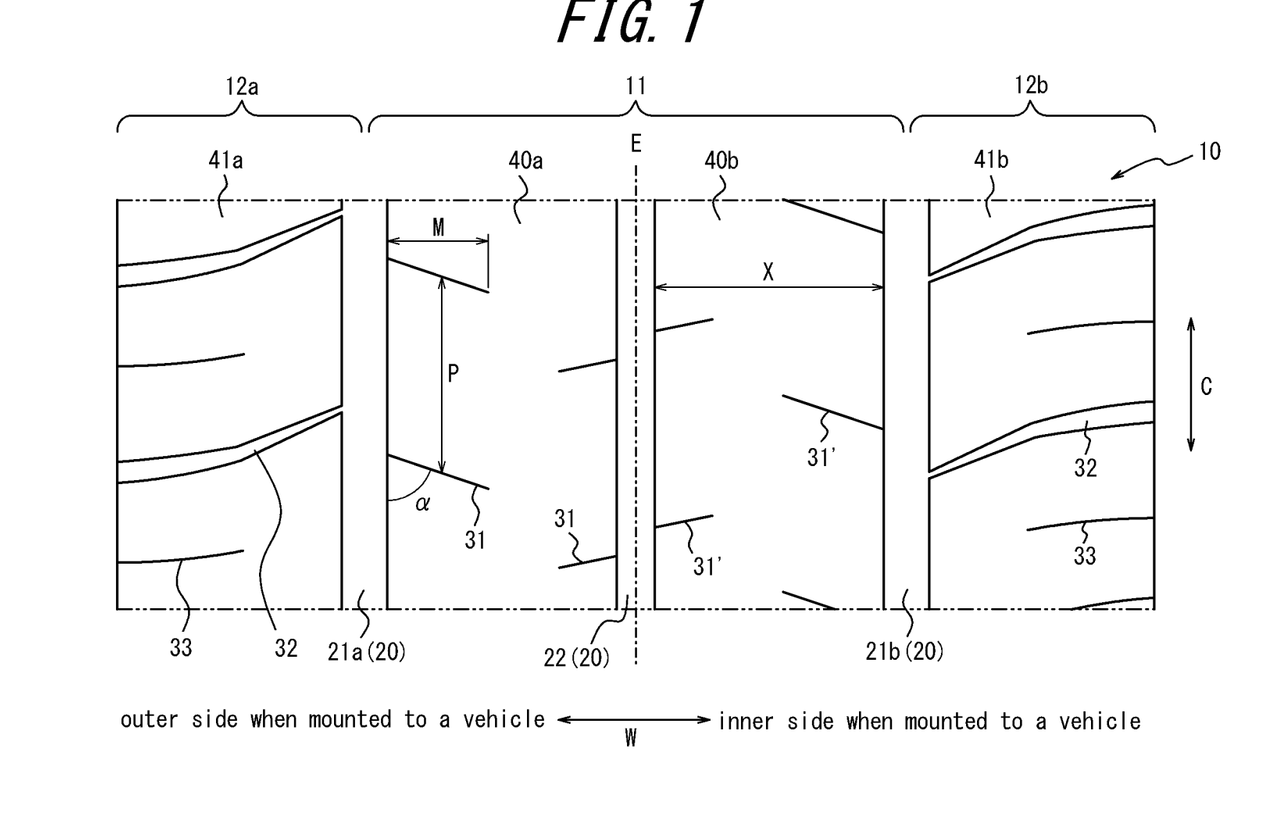
FIG. 1 is a partial development view illustrating a tread pattern of a tire according to an embodiment of this disclosure.

As illustrated in FIG. 1, the tread 10 constituting the tire of this disclosure has a plurality of circumferential grooves 20 (the circumferential grooves 21a, 21b, 22 as for the example in FIG. 1) extending continuously in the tire circumferential direction C (extending linearly along the tire circumferential direction as for the example in FIG. 1), the circumferential grooves 21a, 21b, 22 including circumferential main grooves with a cross-sectional area in the tire width direction W of 10 $mm^2$ or more (all the circumferential grooves 21a, 21b, 22 are circumferential main grooves as for the example in FIG. 1), and, in at least the circumferential groove 21a located on an outermost side when mounted to a vehicle (a vehicle widthwise outermost side) among the circumferential main grooves 21a, 21b, 22 being 25% to 60%, the groove width Lb at the 95% groove depth position with a groove depth of a groove bottom as 100% (the groove width in the cross section perpendicular to the extending direction of the groove in the developed view) with respect to the groove width Lt on a tread surface.

In a tire using to a tread the specific rubber composition mentioned below, by setting the groove widthwise cross-sectional area of the circumferential main grooves 20 to 10 $mm^2$ or more, it is possible to ensure performances such as the drainage performance. Simultaneously, by setting the groove width Lb at the 95% groove depth position of at least the circumferential groove 21a located on an outermost side when mounted to a vehicle within the aforementioned range (25% to 60% with respect to the groove width Lt on a tread surface), it is possible to raise the land portion rigidity of the tread, and as a result, it is possible to improve the steering stability as compared to a conventional tire with a rubber composition containing a thermoplastic resin applied to its tread.

Here, other than the aforementioned circumferential main grooves 21a, 21b, 22, the tread may also have a circumferential groove with a groove widthwise cross-sectional area of less than 10 $mm^2$, or a groove other than the circumferential grooves (inclusive of sipes, etc.).

In this disclosure, the footprint of the tread 10 refers to the outer circumferential surface around the entire circumference of the tire, which contacts the road surface when the tire is rotated in a state mounted to an applicable rim with specified air pressure filled and a load corresponding to the maximum load capability applied.

Here, the "applicable rim" is a valid industrial standard for the region in which the tire is produced or used and refers to an approved rim of applicable size as described in the JATMA YEAR BOOK by JATMA (the Japan Automobile Tyre Manufacturers Association) in Japan, the STAN- DARDS MANUAL by ETRTO (the European Tyre and Rim Technical Organisation) in Europe, the YEAR BOOK by TRA (the Tire and Rim Association, Inc.) in the United States of America, and the like (Measuring Rim in the STANDARDS MANUAL by the ETRTO, and Design Rim in the YEAR BOOK by the TRA). Moreover, the "prescribed internal pressure" refers to an air pressure in accordance with the maximum load capability corresponding to the maximum load capability of the applicable size/ply rating described by the aforementioned JATMA, etc. The "maximum load capability" refers to the maximum mass that the tire is allowed to bear according to the aforementioned standards.

Figure 2A:
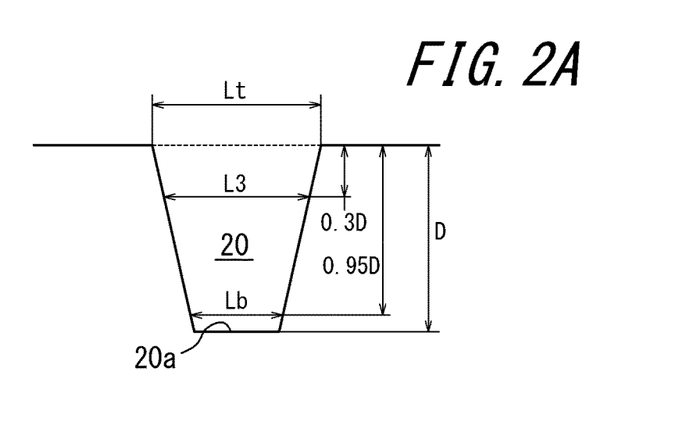
FIGS. 2A and 2B schematically illustrate a tire widthwise cross section of a circumferential main groove formed on a tread of the tire according to an embodiment of this disclosure.

Here, FIG. 2A schematically illustrates the tire widthwise cross section of the circumferential main grooves 20 in order to describe the groove width Lb and the groove width Lt. As illustrated in FIG. 2A, the groove width Lb represents a depthwise position 0.95D corresponding to 95% with a groove width at the groove depth D of the groove bottom as 100%. The groove bottom 20a of the circumferential main groove 20 may be a groove bottom with various shapes, such as bended, flat and the like. Therefore, by defining the groove width Lb at the depthwise position 0.95D, it is possible to correctly define the groove width deep in the circumferential main groove 20. Moreover, as illustrated in FIG. 2A, the groove width Lt on the tread surface refers to a groove width on the surface to which the circumferential main grooves 20 open.

As mentioned above, the groove width Lb at the 95% groove depth position with the groove depth of the groove bottom as 100% is 25% to 60% with respect to the groove width Lt on a tread surface in at least the circumferential groove located on the outermost side when mounted to a vehicle among the circumferential main grooves (the circumferential main groove 21a as for the example in FIG. 1). If the groove width Lb is more than 60% with respect to the groove width Lt, sufficient land portion rigidity of the tread and deformation volume of the tread rubber cannot be obtained, and thus the desired steering stability cannot be obtained. On the other hand, if the groove width Lb is less than 25% with respect to the groove width Lt, the size of the circumferential main groove is excessively small, and thus necessary drainage performance, gripping performance, etc. cannot be ensured.

As illustrated in FIG. 2A, in at least the circumferential groove 20 located on the outermost side when mounted to a vehicle among the circumferential main grooves, it is preferable that the groove width L3 at the 30% groove depth position 0.3D is 85% to 110% with respect to the groove width Lt on the tread surface. This is because that by setting not only the aforementioned groove width Lb at the depthwise position 0.95D, but also the groove width L3 at the 30% groove depth position 0.3D within the aforementioned range (85% to 110%), it is possible to ensure sufficiently excellent drainage performance, and to simultaneously achieve more excellent steering stability. Further, if the groove width L3 at the 30% groove depth position 0.3D is less than 85% with respect to the groove width Lt on the tread surface, the size of the circumferential main groove is reduced, and there is a risk that sufficiently excellent drainage performance, gripping performance, etc. cannot be obtained. On the other hand, if the groove width L3 at the 30% groove depth position 0.3D is more than 110% with respect to the groove width Lt on the tread surface, there is a risk that sufficient land portion rigidity of the tread cannot be obtained, and the steering stability cannot be improved sufficiently.

Figure 2B:
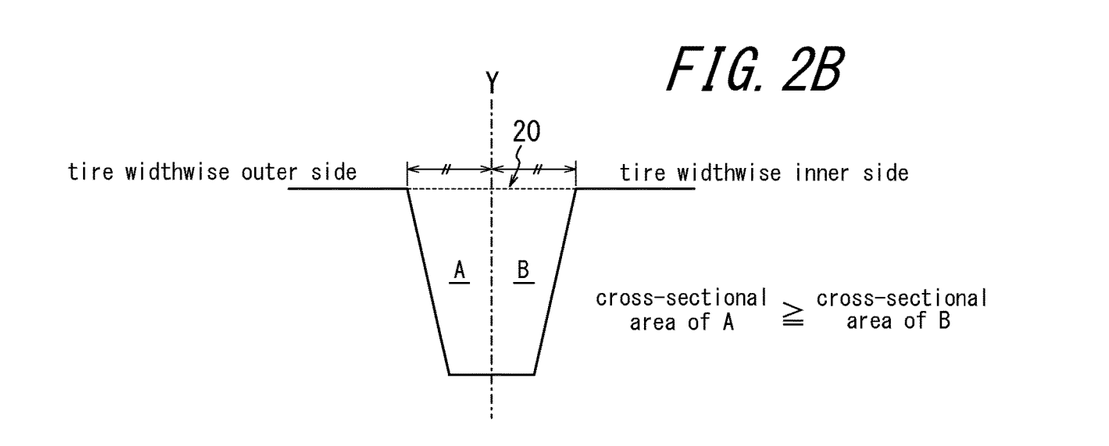

As illustrated in FIG. 2B, it is preferable that when at least the circumferential groove located on the outermost side when mounted to a vehicle among the circumferential main grooves (the circumferential main groove 21a as for the example in FIG. 1) is divided into the tire widthwise outer part (A) and the tire widthwise inner part (B) as viewed in the groove widthwise cross section, with the groove widthwise central line Y on the tread surface (a position with equal distances from both groove walls on the tread surface as viewed in the groove widthwise cross section) as a reference, the tire widthwise cross-sectional area of the tire widthwise outer part (A) is larger than the tire widthwise cross-sectional area of the tire widthwise inner part (B). This is because that it is possible to efficiently raise the land portion rigidity of the tread, particularly within the central region of the tread, and to thereby achieve more excellent steering stability, without deteriorating the drainage performance and the gripping performance.

Here, the method for setting the groove widthwise cross-sectional area of the tire widthwise outer part (A) larger than the groove widthwise cross-sectional area of the tire widthwise inner part (B) is not specifically limited, and is exemplified as a method setting the extension angle of the groove wall of the tire widthwise outer part (A) with respect to the tread surface larger than the extension angle of the groove wall of the tire widthwise outer part (B) with respect to the tread surface, etc.

As illustrated in FIG. 1, the tread 10 may be divided into: a central region 11 partitioned by two circumferential main grooves 21a, 21b located on tire widthwise outermost sides among the circumferential main grooves 20; and two side regions 12a, 12b located on tire widthwise outer sides of the central region 11.

Here, borderlines between the central region 11 and the side regions 12a, 12b are widthwise centers of the two circumferential main grooves 21a, 21b.

Further, the central region 11 has a central land portion 40 (central land portions 40a, 40b in the example of FIG. 1) formed by partitioning by the circumferential main grooves 20 (the circumferential main grooves 21a, 22, 21b in the example of FIG. 1), and the side regions 12a, 12b have side land portions 41a, 41b.

A ratio of a total area of the central land portions 40a, 40b located in the central region 11 with respect to an area of the entire tire land portion on the footprint of the tread 10 (the central land portions 40a, 40b and the side land portions 41a, 41b in the example of FIG. 1) is preferably 40% to 60%, more preferably 50% to 60%. This is because that by setting the volume of the central region 11 to a large value, it is possible to increase the land portion rigidity, and to thereby obtain more excellent steering stability.

Moreover, from the point of obtaining the same effect, as illustrated in FIG. 1, and independent land portion width X of the central region 11 is preferably 1.5 times or more, more preferably 3 times or more to the groove depth of the circumferential main groove 21a adjacent on the tire widthwise outer side. Here, as illustrated in FIG. 1, in the case where the central region 11 has two central land portions 40a, 40b separated in the tire width direction by the circumferential groove 22, the independent land portion width of the central region 11 refers to the width X of one central land portion (the central land portion 40b in the example of FIG. 1).

The number of the circumferential grooves 20 is not specifically limited. For example, it is possible to use one constituted by the two circumferential grooves 21a, 21b located on the tire widthwise outer sides and the one circumferential groove 22 located on the tire widthwise center as illustrated in FIG. 1, or increase the number of circumferential grooves 21 located on the tire widthwise outer sides and/or the number of the circumferential grooves 22 located on the tire widthwise center.

As illustrated in FIG. 1, it is preferable that the central land portions 40a, 40b have a plurality of widthwise narrow grooves 31, 31' with a small groove width, which open to the circumferential main grooves (the circumferential main grooves 21a, 21b in the example of FIG. 1) and do not connect to another adjacent circumferential main groove (the circumferential main groove 22 in the example of FIG. 1). This is because that by disposing the widthwise narrow grooves 31, 31' within the central land portion, it is possible to ensure the rigidity of the central region 11, and to simultaneously improve the braking performance when wet via a water film removal effect of each narrow groove 31, 31'.

Here, the circumferential main grooves to which the widthwise narrow grooves 31, 31' open are not specifically limited. For example, it is possible to use one opening to the circumferential main grooves 21a, 21b located on the tire widthwise outer sides as illustrated in FIG. 1, or one opening to the circumferential main groove 22 located on the tire widthwise central side as illustrated in FIG. 2.

The widthwise narrow grooves 31, 31' more preferably extend in a direction at 50° to 85° (i.e., an extension angle α with respect to the tire circumferential direction of the widthwise narrow groove satisfies 50°≤α≤85°), particularly preferably extend in a direction at 60° to 80° with respect to the tire circumferential direction C. This is because that it is possible to maintain the rigidity of the central region 11 at a high level, and to simultaneously improve the braking performance when wet via a water film removal effect of each narrow groove 31, 31'.

As illustrated in FIG. 1, it is preferable that the widthwise narrow grooves 31 are arranged alternately in the tire circumferential direction C with the widthwise narrow grooves 31' extending oppositely across the tire equator E, the arranging spacing P of the widthwise narrow grooves 31, 31' opening to the same circumferential main grooves 21a, 21b being 0.5% to 4.5% to the circumferential length of the tire equatorial plane on the tread surface. This is because that by arranging the widthwise narrow grooves 31 and the widthwise narrow grooves 31' alternately across the tire equator E, it is possible to achieve both the braking performance when wet and the steering stability at a high level.

It is preferable that the widthwise narrow grooves 31, 31' include sipes and/or notch grooves. Here, the sipes refer to ultra narrow grooves with a groove width on the tread surface of 1.5 mm or less, and the notch grooves refer to narrow grooves with a groove width on the tread surface of 1.5 mm to 3.5 mm.

As illustrated in FIG. 1, a tire widthwise length M of the widthwise narrow grooves 31, 31' is not specifically limited, but from the viewpoint of achieving both the braking performance when wet and the steering stability at a high level, the degree with respect to the land portion width X (M/X) is preferably within a range of 0.2≤M/X≤0.8, more preferably 0.3≤M/X≤0.7.

As illustrated in FIG. 2, the central region 11 may have lug grooves 34, 34' other than the widthwise narrow grooves 31, 31'. In this case, regarding the lug grooves 34, 34' arranged on the central region 11, similarly as the widthwise narrow grooves 31, 31', the lug grooves 34 are arranged alternately in the tire circumferential direction C with the lug grooves 34' extending oppositely across the tire equator E, the arranging spacing Q of the lug grooves 34, 34' opening to the same circumferential main grooves 21a, 21b being 0.5% to 4.5% to the circumferential length of the tread. Moreover, it is possible to have narrow widthwise grooves 34, 34' other than the lug grooves 34 as well.

As illustrated in FIG. 1, the side regions 12a, 12b may have lug grooves 32 and side region narrow grooves 33.

Here, it is preferable that the lug grooves 32 in FIG. 1 do not connect to the adjacent circumferential main grooves 21a, 21b, or connect to the circumferential main grooves 21a, 21b in a state where a part of the groove bottom is raised up. This is because that by configuring the lug grooves 32 as mentioned above, it is possible to obtain excellent braking performance, and to simultaneously ensure the land portion rigidity of the tread, and to thereby achieve the desired steering stability.

Figure 3:
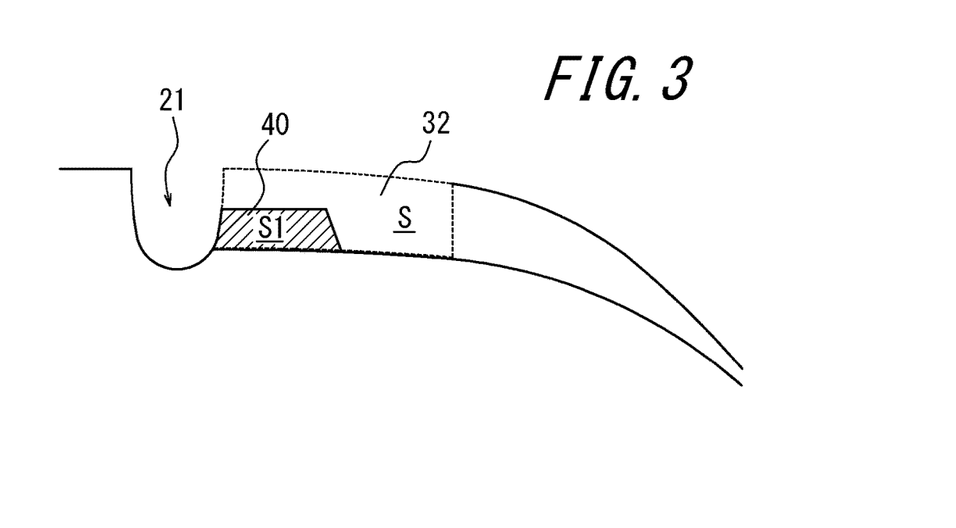
FIG. 3 schematically illustrates a cross section in the groove extending direction of the lug groove of the tread pattern in FIG. 1.
Figure 4:
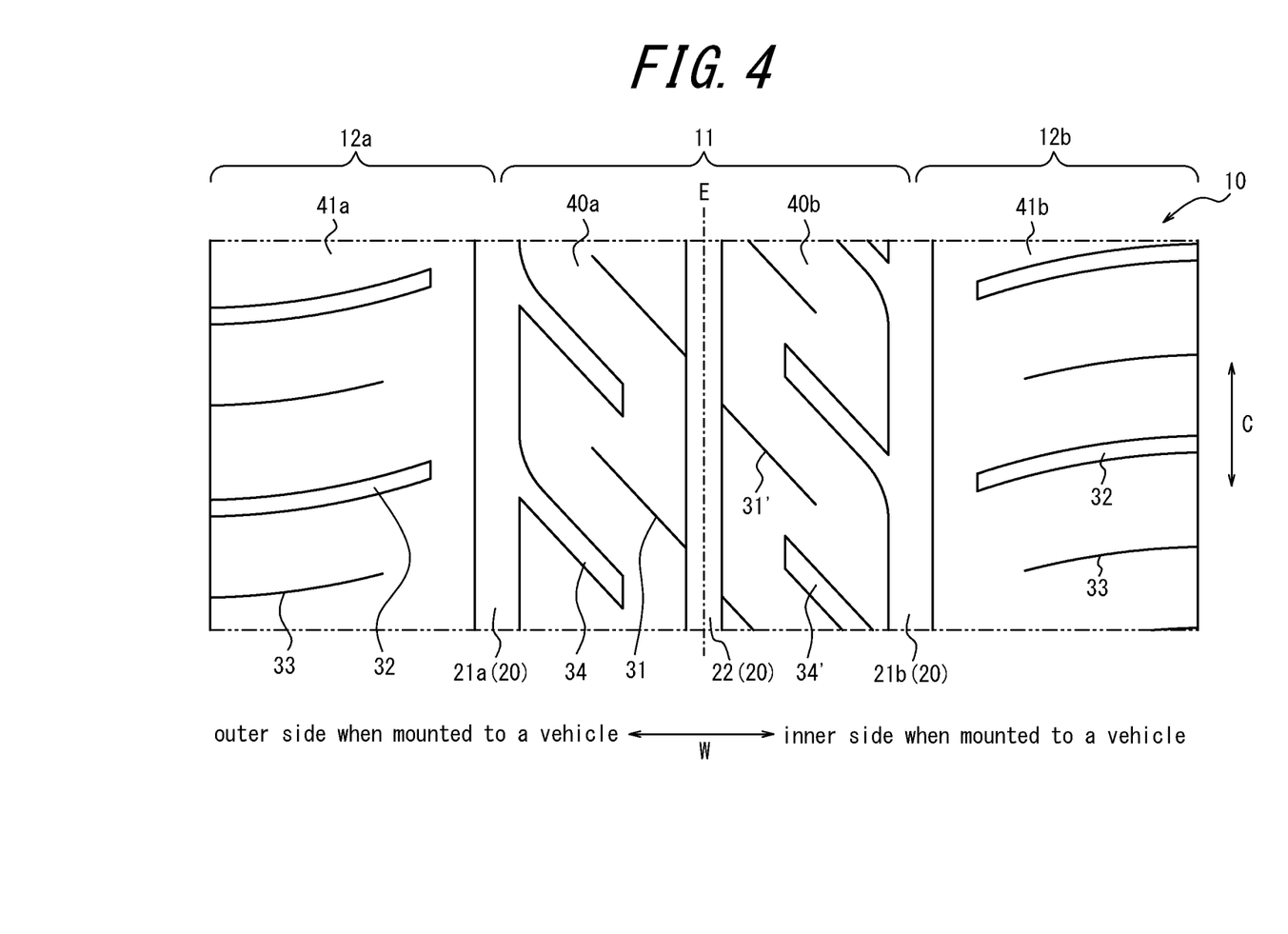
FIG. 4 is a partial development view illustrating a tread pattern of a tire as a sample of a comparative example.

Here, in order to describe the configuration of the lug grooves 32, FIG. 3 schematically illustrate a cross section in a groove extension direction of the lug grooves 32 in FIG. 1. "The lug grooves 32 connect to the circumferential main grooves 21a, 21b in a state where a part of the groove bottom is raised up" means that as illustrated in FIG. 3, the lug grooves 32 connect to the circumferential main grooves 21 (21a, 21b) in a state where a part 40 in which the groove bottom of the lug grooves 32 is raised up is formed in a connecting part to the circumferential main grooves 21 (21a, 21b).

In the case where the lug grooves 32 connect to the circumferential main grooves 21a, 21b in a state where the groove bottom is raised up, as illustrated in FIG. 3, in the extension-direction cross section of the lug grooves 32, a ratio of a cross-section area S1 of the raised bottom part 40 to a cross-section area S of an entire lug groove 32 (S1/S× 100%) is preferably 20% or more, more preferably 30% or more. This is because that it is possible to ensure the land portion rigidity of the tread more securely even when lug grooves are disposed.

As illustrated in FIG. 1, it is preferable that a groove width of the lug grooves 32 is reduced from a tire widthwise outer side toward a tire widthwise central side. This is because that in the case where end portions of the lug grooves 32 are adjacent or connect to the circumferential main grooves 21a, 21b, by reducing the groove width of the lug grooves 32 from the tire widthwise outer side to the tire widthwise central side, it is possible to ensure the land portion rigidity of the tread more securely even when lug grooves are disposed.

Figure 5:
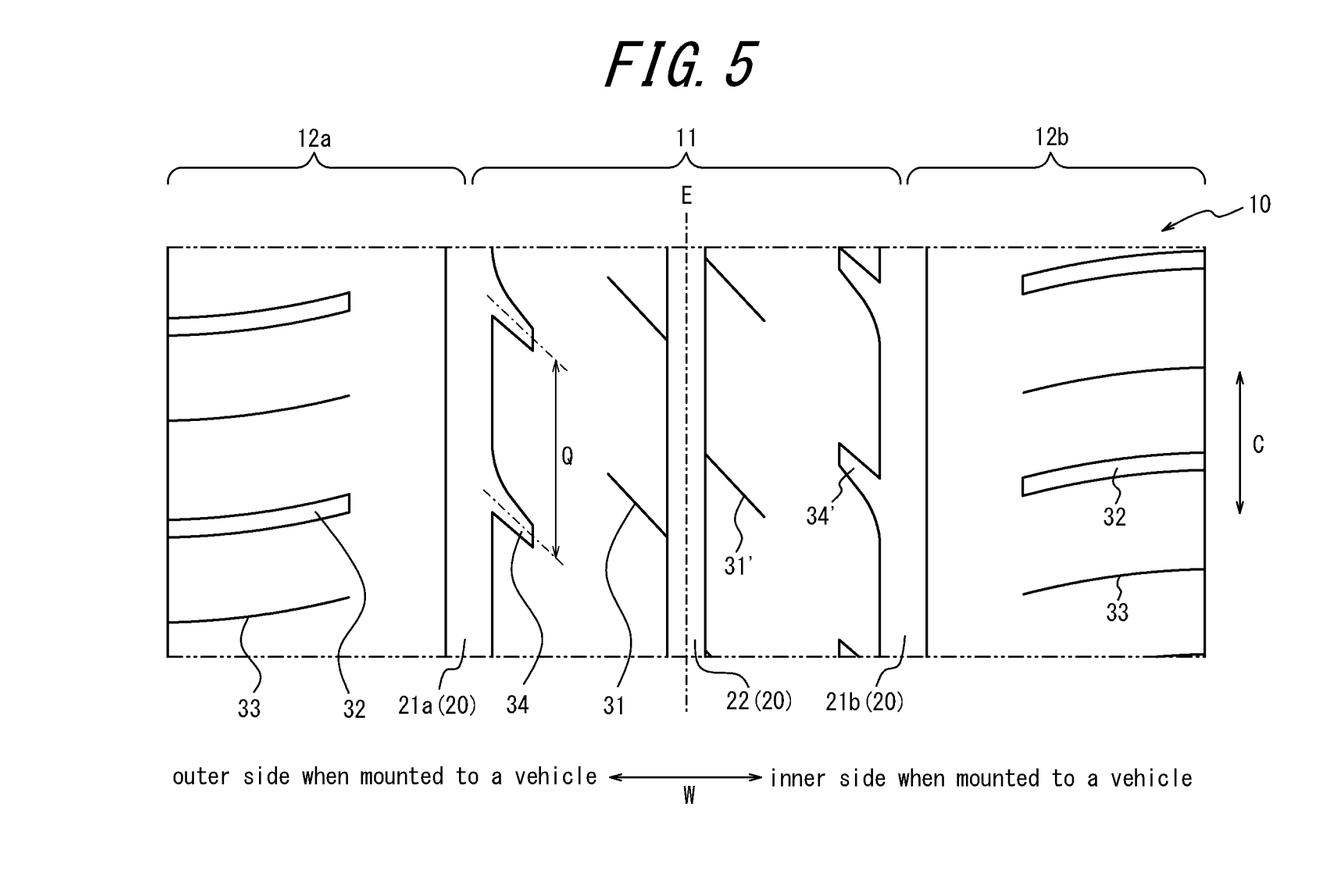
FIG. 5 is a partial development view illustrating a tread pattern of a tire according to another embodiment of this disclosure.

The tread patterns as illustrated in the examples in FIG. 1 and FIG. 5 have shapes symmetrical with respect to a predetermined point on the tire equator.

<Rubber Composition>

The tire of this disclosure has a tread formed with a rubber composition of which a tan δ at 0° C. is 0.25 to 0.55, a difference between a tan δ at 30° C. and a tan δ at 60° C. is −0.02 to 0.07, and a dynamic storage modulus at a dynamic strain of 1% and 0° C. is 4 MPa to 20 MPa.

If the rubber composition has these physical properties, the obtained tread rubber is capable of achieving excellent braking performance on dry road surface and on wet road surface.

The rubber composition is not specifically limited as long as satisfying the aforementioned physical properties, but more specifically, the rubber composition is preferably a rubber composition containing: a rubber component A containing 50 mass % or more of a diene based rubber; and 5 to 50 parts by mass per 100 parts by mass of the rubber component of at least one additive component B selected from a thermoplastic resin, an oil or a low molecular weight aromatic vinyl compound-conjugated diene compound copolymer with a polystyrene-equivalent weight-average molecular weight of 5,000 to 200,000 measured by gel permeation chromatography.

By compounding a specific amount of the additive component B with respect to the rubber component A as mentioned above, it is possible to improve the grounding property of the tread rubber, and to improve the performances on wet road surface of the tire. Moreover, since the additive component B has a particularly high compatibility with natural rubber or diene based rubbers such as butadiene rubber, it is particularly easy to obtain its compounding effect in rubber component A rubber composition containing 50 mass % or more of a diene based rubber. Moreover, the rubber component itself has a high softness by containing 50 mass % or more of a diene based rubber, and thus is capable of achieving high braking performance on dry road surface and on slippery road surface such as manhole and the like.

The rubber component A contains 50 mass % or more, preferably 70 mass % or more, more preferably 80 mass % or more of a diene based rubber. By setting the diene based rubber content to 50 mass % or more in the rubber component, the effect of thermoplastic resin compounding mentioned below is sufficiently exhibited.

Here, the diene based rubber is not specifically limited, and is exemplified as natural rubber, styrene-butadiene rubber, isoprene rubber, butadiene rubber, chloroprene rubber, acrylonitrile-butadiene rubber, isobutylene-isoprene rubber, etc., but among these, from the viewpoint of achieving more excellent braking performance, it is preferable to use natural rubber or butadiene rubber. Here, the diene based rubber may be used singly or in a combination of a plurality. Furthermore, it is more preferable to contain 40 mass % or more of the natural rubber, particularly preferable to contain 70 mass % or more of the natural rubber.

It is preferable that the rubber component A contains a styrene-butadiene rubber (SBR). This is because that by compounding with SBR, it is possible to raise the glass transition temperature (Tg) of the rubber composition, and to thereby improve the steering stability on dry road surface and the braking performance.

Furthermore, it is preferable that the rubber composition uses as the SBR an SBR of which the percentage of a bound styrene content among all polymer units+the percentage of a vinyl bond content among all polymer units×½ is 25 mass % or less. If the ratio of the bound styrene content and the ratio of the vinyl bond content within all polymer units satisfy the aforementioned correlation, it is possible to further improve the wet performance of the rubber composition, and to thereby further improve the braking performance on dry road surface and on wet road surface of the tire.

The thermoplastic resin contained as the additive component B in the rubber composition is not specifically limited. By using a thermoplastic resin, the loss tangent (tan δ) at 0° C. is raised, and thus it is possible to improve mainly the performances on wet road surface of the tire. In the case where the rubber component contains a large amount of natural rubber, since the thermoplastic resin has a high compatibility with the natural rubber, it is particularly easy to obtain the aforementioned performance improvement effect on wet road surface.

From the viewpoint of further improvement of the braking performance on dry road surface and on wet road surface, it is preferable that the thermoplastic resin is a C5 based resin, a C9 based resin, a C5 to C9 based resin, a dicyclopentadiene based resin, a rosin based resin, an alkylphenol based resin, or a terpenephenol based resin. These thermoplastic resins may be used singly or in a combination of a plurality.

Here, the C5 based resin refers to a C5 based synthetic petroleum resin, which is a solid polymer obtained by polymerizing a C5 fraction using a catalyst for the Friedel-Crafts reaction, such as $AlCl_3$, $BF_3$ and the like. Specific examples thereof may include: a copolymer including, as main components, isoprene, cyclopentadiene, 1,3-pentadiene, and 1-pentene; a copolymer of 2-pentene and dicyclopentadiene; a polymer mainly composed of 1,3-pentadiene, etc.

Here, the C9 based resin refers to a C9 based synthetic petroleum resin, which is a solid polymer obtained by polymerizing a C9 fraction using a catalyst for the Friedel-Crafts reaction, such as $AlCl_3$, $BF_3$ and the like. Specific examples thereof may include a copolymer including, as main components, indene, methylindene, α-methylstyrene, vinyltoluene, etc.

The C5 to C9 based resin refers to a C5 to C9 based synthetic petroleum resin, which is a solid polymer obtained by polymerizing a C5 to C9 fraction using a catalyst for the Friedel-Crafts reaction, such as $AlCl_3$, $BF_3$ and the like. Specific examples thereof may include a copolymer including, as main components, styrene, vinyltoluene, α-methylstyrene, indene, etc. In this disclosure, from the viewpoint of the compatibility with the rubber component, this C5 to C9 resin is preferably a resin with a small amount of a component of C9 or more. Here, "a small amount of a component of C9 or more" means that the component of C9 or more is less than 50 mass %, preferably 40 mass % or less in the entire amount of the resin.

The dicyclopentadiene based resin refers to a petroleum resin using the dicyclopentadiene in the C5 fraction as a main raw material. Specific examples thereof include trade name "Marcarez M" series (M-890A, M-845A, M-990A, etc.), made by Maruzen Petrochemical Co., Ltd.

The rosin resin include: natural resin rosins such as gum rosin, tall oil rosin and wood rosin contained in raw rosin or tall oil; modified rosin, rosin derivative and modified rosin derivative such as polymerized rosin, partially hydrogenated rosin thereof; glycerin ester rosin, partially hydrogenated rosin and completely hydrogenated rosin thereof; pentaerythritol ester rosin, partially hydrogenated rosin and polymerized rosin thereof, etc.

The alkylphenol based resin refers to a phenol based resin having an alkyl group. Examples thereof include alkylphenol-acetylene resin such as p-tert-butylphenol-acetylene resin, alkylphenol-formaldehyde resin with a low degree of polymerization, etc.

The terpene phenol based resin refers to a resin obtainable by reacting terpenoids and various phenols by using a Friedel-Crafts catalyst, or further condensing the same with formalin. Terpenoids for use as the material are not particularly limited, and may preferably be a monoterpene hydrocarbon such as α-pinenes and limonenes, more preferably terpenoids including α-pinenes, and particularly preferably be α-pienes. In this disclosure, terpene-phenol based resin having a large ratio of phenol component is preferable.

It is preferable that the rubber composition contains a Novolak-type phenol resin. By containing a Novolak-type phenol resin, it is possible to raise the elastic modulus in the rubber composition and to thereby improve the steering stability without using a curing agent, and without deteriorating the wet performance.

The content of the thermoplastic resin in the rubber composition is 5 to 50 parts by mass per 100 parts by mass of the rubber component, but from the viewpoint of the capability of obtaining more excellent braking performance on dry road surface and on wet road surface, 10 to 30 parts by mass is preferable.

The oil contained as the additive component B in the rubber composition is not specifically limited. Examples for the oil may include: petroleum-based softeners such as aroma oil, paraffin oil, spindle oil, naphthene oil, MES, TDAE and SRAE; and plant-based softeners such as palm oil, castor oil, cottonseed oil and soybean oil. The oil to be compounded may preferably be in a liquid state at ordinary temperature such as 25° C. in view of handling easiness. Of those described above, for example, a petroleum-based softener such as aroma oil, paraffin oil and naphthene oil is preferred.

It is preferable that the additive component B contained in the rubber composition is a low molecular weight aromatic vinyl compound-conjugated diene compound copolymer with a polystyrene-equivalent weight-average molecular weight of 5,000 to 200,000 measured by gel permeation chromatography. By using an aromatic vinyl compound-conjugated diene compound copolymer with an average molecular weight of 5,000 to 200,000, it is possible to improve the softness of the rubber composition, and to achieve high braking performance on dry road surface and on slippery road surface such as manhole and the like. Further, in order to sufficiently improve the wet performance of the rubber composition, it is preferable that a content of the aromatic vinyl compound is 5 to 80 mass %, and a vinyl bond content of a conjugated diene compound moiety is 10 to 80 mass %.

The rubber composition may contain a filler other than the rubber component and the additive component B. By containing a filler (C), it is possible to achieve high reinforcement performance and low heat generating property without deteriorating the properties of the rubber, such as the softness.

A compounding amount of the filler in the rubber composition is not specifically limited, but is preferably 30 to 100 parts by mass, more preferably 40 to 80 parts by mass per 100 parts by mass of the rubber component.

By setting the compounding amount of the filler to 30 to 100 parts by mass, it is possible to exhibit the reinforcing effect of the rubber component without deteriorating its properties such as the softness, and on the other hand, by setting the compounding amount of the filler to 40 to 80 parts by mass, in particular, it is possible to exhibit the effect of reduction of the rolling resistance and improvement of the braking performance on wet road surface, and to simultaneously decrease the probability of deteriorating the softness of the rubber component.

The type of the filler (C) is not specifically limited, and is exemplified as fillers such as silica, carbon black, aluminum oxide, clay, alumina, talc, mica, kaolin, glass balloon, glass beads, calcium carbonate, magnesium carbonate, magnesium hydroxide, calcium carbonate, magnesium oxide, titanium oxide, potassium titanate and barium sulfate.

Among the aforementioned filler (C), from the view point of exhibiting the effect of reduction of the rolling resistance and improvement of the braking performance on wet road surface, and simultaneously decreasing the probability of deteriorating the softness of the rubber component, it is preferable to use silica. By containing silica in the rubber composition, it is possible to apply sufficient reinforcement performance and low heat generating property to it in a state where the diene based rubber and the thermoplastic resin are well dispersed, without deteriorating its softness.

Examples of silica may include: wet silica (hydrous silica), dry silica (anhydrous silica), calcium silicate, aluminum silicate, with wet silica being suitably used in particular. This wet silica has BET specific surface area of preferably 40 $m^2/g$ to 350 $m^2/g$. A silica within this range of BET specific surface area has the advantage of the capability of achieving both the rubber reinforcement performance and the dispersibility in the rubber component. From this viewpoint, a silica with a BET specific surface area of 80 $m^2/g$ to 300 $m^2/g$ is further preferable. Such silica may be commercially available ones, such as trade names "Nipsil AQ", "Nipsil KQ", made by Tosoh Silica Corporation, and trade name "Ultrasil VN3", made by Degussa AG. This silica may be used singly or in a combination of two or more.

Further, a compounding amount of the silica is preferably within a range of 40 to 70 parts by mass, more preferably within a range of 45 to 60 parts by mass per 100 parts by mass of the rubber component. If the compounding amount of the silica is 40 parts by mass or more per 100 parts by mass of the rubber component, tan δ at 60° C. of the rubber composition is reduced, which improves the fuel efficiency during ordinary running of a tire applied with the rubber composition. Moreover, if 70 parts by mass or less, the softness of the rubber composition is improved, and by applying the rubber composition to a tread rubber of a tire, a deformation volume of the tread rubber is increased, which enables improvement of the wet performance of the tire. Moreover, among the filler (C), if the silica is 50 mass % or more, preferably 70 mass % or more, further more preferably 90 mass % or more, the braking performance on wet road surface is further improved.

In the rubber composition of this disclosure, it is preferable that the filler (C) further contains a carbon black, and a compounding amount of the carbon black is preferably within a range of 1 to 10 parts by mass, more preferably within a range of 30 to 80 parts by mass per 100 parts by mass of the rubber component. By compounding the carbon black by 1 part by mass or more, the rigidity of the rubber composition is improved, and by compounding by 10 parts by mass or less, it is possible to suppress the increase of the loss tangent (tan δ). Therefore, by applying the rubber composition to a tread rubber of a tire, it is possible to achieve both the fuel efficiency and the wet performance of the tire at a high level. The carbon black is not specifically limited, and is exemplified as carbon blacks of GPF, FEF, HAF, ISAF, SAF grade. Among these, from the viewpoint of improving the wet performance of the tire, a carbon black of ISAF and SAF grade is preferable. These carbon blacks may be used singly or in a combination of two or more.

As the carbon black, it is preferable that the rubber composition further contains a carbon black with a nitrogen adsorption specific surface area of 110 $m^2/g$ or more and a carbon black with a nitrogen adsorption specific surface area of 80 $m^2/g$ or less. By compounding a carbon black with a nitrogen adsorption specific surface area of 110 $m^2/g$ or more, it is possible to ensure the wet performance at a high level, and by simultaneously compounding a carbon black with a nitrogen adsorption specific surface area of 80 $m^2/g$ or less, it is possible to ensure the elastic modulus of the tire, which enables improvement of the steering stability.

In the case where the rubber composition contains a silica as the filler, in order to further improve the reinforcement performance and the low heat generating property of the compounded silica, it is preferable to further contain a silane coupling agent.

Examples of the silane coupling agent may include: bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylprpopyl-N,N-dimethylthiocarbamoyltetrasulfide, 3-triethoxysilylprpopyl-N,N-dimethylthiocarbamoyltetrasulfide, 2-tri ethoxysilylethyl-N,N-dimethylthiocarbamoyltetrasulfide, 3-trimethoxysilylpropylbenzothiazyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide, among which bis(3-triethoxysilylpropyl)trisulfide and 3-trimethoxysilylpropylbenzothiazoletetrasulfide are suited for use in view of the reinforcement improving effect.

These silane coupling agents may be used singly or in a combination of two or more.

A preferred content of the silane coupling agent in the rubber composition differs depending on the type of the silane coupling agent, but is preferably selected within a range of 2 to 25 mass % with respect to the silica. When the amount is less than 2 mass %, the silane coupling agent fails to fully exhibit the effect thereof, and when more than 25 mass %, there is a risk of causing gelation of the rubber component.

From the viewpoint of the effect as a coupling agent and gelation prevention, the content of this silane coupling agent is preferably within a range of 2 to 20 mass %, further preferably 5 to 18 mass %, particularly preferably 5 to 15 mass %.

The disclosed rubber composition may be compounded with, in addition to the aforementioned rubber component, thermoplastic resin and filler, other compounding agents generally used in the rubber industry, such as, for example, antioxidant, vulcanization accelerator, a vulcanization accelerator aid, and vulcanizing agent, which may be selected as appropriate without affecting the object of the present disclosure, within a range of general amount. Commercially available products may be suitably used as these additives. Further, the rubber composition can be manufactured with a well-known method, for example, by compounding the rubber components with the thermoplastic resin, the filler and various additives appropriately selected as necessary, and subjecting the same to kneading, warming, extrusion, etc.

The method for using the rubber composition to the tread rubber may be a well-known method as well. For example, it is possible to use the aforementioned rubber composition to the tread rubber to form a raw tire, and to manufacture a tire by vulcanizing the raw tire with a usual method.

INDUSTRIAL APPLICABILITY

According to this disclosure, it is possible to provide a tire having excellent braking performance on dry road surface and on wet road surface, and having excellent steering stability.

REFERENCE SIGNS LIST 10 tread
11 central region
12, 12a, 12b side region
20 circumferential main groove (circumferential groove)
21, 21a, 21b circumferential main groove (circumferential groove)
22, 22a, 22b circumferential groove
31, 31' widthwise narrow groove
32b lug groove
33 side region narrow groove
34, 34' lug groove
E tire equator
C tire circumferential direction
W tire width direction
P arranging spacing of widthwise narrow groove
X independent land portion width of central region
α extension angle with respect to tire circumferential direction of narrow width groove
S cross-section area in extension direction of lug groove
S1 cross-section area in lug groove extension direction in raised bottom region of lug groove
Lt groove width on tread surface
L3 groove width at 30% groove depth position
Lb groove width at 95% groove depth position
Y groove centerline
A tire widthwise outer part
B tire widthwise inner part

The invention claimed is:

1. A tire comprising a tread formed by using a rubber composition of which a tan δ at 0° C. is 0.25 to 0.55, a difference between a tan δ at 30° C. and a tan δ at 60° C. measured under the conditions of initial strain of 2%, dynamic strain of 1% and frequency of 52 Hz is −0.02 to 0.07, and a dynamic storage modulus at 0° C. measured under the conditions of initial strain of 2%, dynamic strain of 1% and frequency of 52 Hz is 4 MPa to 20 MPa, wherein:
the tread has a plurality of circumferential grooves extending continuously in a tire circumferential direction,
the circumferential grooves comprises:
a first circumferential main groove designated to be located on a widthwise outer side when mounted to a vehicle and having a groove width Lb at a 95% groove depth position with a groove depth of a groove bottom as 100% being 25% to 60% with respect to a groove width Lt on a tread surface;
a second circumferential main groove designated to be located on a widthwise inner side when mounted to a vehicle; and
a third circumferential main groove located between the first and second circumferential grooves;
each of the circumferential main grooves has a groove widthwise cross-sectional area of 10 mm² or more,
the tread has two central land portions partitioned by the first and third circumferential main grooves and the second and third circumferential main grooves,
the central land portions extend continuously in the tire circumferential direction and have a plurality of widthwise narrow grooves with a small groove width,
each of the plurality of widthwise narrow grooves extends from one of the circumferential main grooves and terminates within one of the central land portions,
the third main groove does not communicate with the first and second main grooves via a groove,
when at least the circumferential groove located on an outermost side when mounted to a vehicle among the circumferential main grooves is divided into a tire widthwise outer part and a tire widthwise inner part as viewed in a groove widthwise cross section, with a groove widthwise central line on the tread surface as a reference, a tire widthwise cross-sectional area of the tire widthwise outer part is more than a tire widthwise cross-sectional area of the tire widthwise inner part, and a groove width L3 at a 30% groove depth position is 85% to 110% with respect to the groove width Lt on the tread surface in at least the circumferential groove located on an outermost side when mounted to a vehicle among the circumferential main grooves.

2. The tire according to claim 1, wherein:
the tread is formed with a rubber composition containing: a rubber component A containing 50 mass % or more of a diene based rubber; and 5 to 50 parts by mass per 100 parts by mass of the rubber component of at least one additive component B selected from a thermoplastic resin, an oil or a low molecular weight aromatic vinyl compound-conjugated diene compound copolymer with a polystyrene-equivalent weight-average molecular weight of 5,000 to 200,000 measured by gel permeation chromatography.

3. The tire according to claim 2, wherein:
the diene based rubber is a natural rubber or a butadiene rubber.

4. The tire according to claim 3, wherein:
the thermoplastic resin is a C5 based resin, a C9 based resin, a C5 to C9 based resin, a dicyclopentadiene based resin, a rosin based resin, an alkylphenol based resin, or a terpenephenol based resin.

5. The tire according to claim 3, wherein:
the additive component B contains a Novolak-type phenol resin.

6. The tire according to claim 3, wherein:
the rubber composition further contains a carbon black with a nitrogen adsorption specific surface area of 110 $m^2/g$ or more and a carbon black with a nitrogen adsorption specific surface area of 80 $m^2/g$ or less.

7. The tire according to claim 3, wherein:
the rubber composition contains 50 mass % or more of a styrene-butadiene rubber of which the percentage of a bound styrene content among all polymer units+the percentage of a vinyl bond content among all polymer units×½ equals 25% or less.

8. The tire according to claim 2, wherein:
the thermoplastic resin is a C5 based resin, a C9 based resin, a C5 to C9 based resin, a dicyclopentadiene based resin, a rosin based resin, an alkylphenol based resin, or a terpenephenol based resin.

9. The tire according to claim 8, wherein:
the additive component B contains a Novolak-type phenol resin.

10. The tire according to claim 2, wherein:
the additive component B contains a Novolak-type phenol resin.

11. The tire according to claim 2, wherein:
the rubber composition further contains a carbon black with a nitrogen adsorption specific surface area of 110 $m^2/g$ or more and a carbon black with a nitrogen adsorption specific surface area of 80 $m^2/g$ or less.

12. The tire according to claim 2, wherein:
the rubber composition contains 50 mass % or more of a styrene-butadiene rubber of which the percentage of a bound styrene content among all polymer units+the percentage of a vinyl bond content among all polymer units×½ equals 25% or less.

13. The tire according to claim 1, wherein:
the rubber composition contains 50 mass % or more of a styrene-butadiene rubber of which the percentage of a bound styrene content among all polymer units+the percentage of a vinyl bond content among all polymer units×½ equals 25% or less.

14. The tire according to claim 1, wherein:
adjacent two of the widthwise narrow grooves extending in a same direction and opening to the same circumferential main grooves are circumferentially spaced apart at 0.5% to 4.5% of a circumferential length of the tire equatorial plane on the tread surface.

15. The tire according to claim 1, wherein:
each of the central land portions has lug grooves, and adjacent two of the lug grooves extending in a same direction and opening to the same circumferential main grooves are circumferentially spaced apart at 0.5% to 4.5% of a circumferential length of the tire equatorial plane on the tread surface.

\* \* \* \* \*